(12) United States Patent
Eguchi et al.

(10) Patent No.: US 6,989,655 B2
(45) Date of Patent: Jan. 24, 2006

(54) ENGINE GENERATOR

(75) Inventors: Hiroyuki Eguchi, Saitama (JP); Motohiro Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 10/784,746

(22) Filed: Feb. 24, 2004

(65) Prior Publication Data
US 2004/0178637 A1    Sep. 16, 2004

(30) Foreign Application Priority Data
Mar. 13, 2003    (JP) .............................. 2003-067965

(51) Int. Cl.
*H02P 9/00*    (2006.01)

(52) U.S. Cl. .......................... 322/23; 322/28; 290/36 R

(58) Field of Classification Search ................. 322/20, 322/22, 23, 27, 28; 290/36 R, 38 R; 318/599, 318/77
See application file for complete search history.

(56) References Cited

U.S. PATENT DOCUMENTS

| | | | | |
|---|---|---|---|---|
| 5,448,154 A | * | 9/1995 | Kanke et al. ................... | 322/28 |
| 5,581,168 A | * | 12/1996 | Rozman et al. ............. | 318/723 |
| 6,486,632 B2 | * | 11/2002 | Okushima et al. .......... | 318/599 |
| 6,888,263 B2 | * | 5/2005 | Satoh et al. ................... | 290/52 |

FOREIGN PATENT DOCUMENTS

JP          05-292799          11/1993

* cited by examiner

*Primary Examiner*—Nicholas Ponomarenko
(74) *Attorney, Agent, or Firm*—Westerman, Hattori, Daniels & Adrian, LLP

(57) ABSTRACT

An engine generator, sufficiently meeting a demand for a simple configuration and easy control, is provided. The output of a generator 1 connected to an engine 2 is output through a rectifier circuit 3 and an inverter 4. The generator 1 is a dual-purpose generator both for a generator function and for an electric motor function, and is driven by a drive inverter as an engine starting electric motor. A DC—DC converter 5 is provided between the output side of the rectifier circuit 3 and the output terminal of a battery 6. The generator 1 is driven as an engine starting electric motor, using the battery 6 as a power supply, when the engine is started.

4 Claims, 2 Drawing Sheets

ENGINE GENERATOR

BACKGROUND OF THE INVENTION

1. Field of the Invention

The invention relates to an engine generator, and more particularly, to an engine generator which uses a generator driven by an engine as an engine starting electric motor.

2. Description of the Related Art

An engine generator has diffused into widespread practice as a power supply device for various kinds of uses such as portable use and emergency one. In recent years, an engine generator has been also used as an engine starting electric motor, especially, responding to a demand for smaller size and reduction in the number of components.

If the alternating current (AC) output of the engine generator is, for example, 100 V AC when an engine generator is also used as an engine starting electric motor, a direct current power supply (high voltage battery) of about 140 V is required to drive the generator as an engine starting electric motor, because an output of 140 V or more is required as a peak value of the generator itself.

Moreover, generally, a generator output circuit and an electric motor starting circuit are separately provided and those circuits are used by switching for operation as a generator and as an electric motor in order to operate the generator as an electric motor when an engine is started and as a generator after the engine is started.

An engine generator, in which a generator output circuit is also used as an electric motor starting circuit, has been proposed. For example, an engine generator has been proposed in the Japanese Patent Application Laid-open No. H5-292799. According to the engine generator comprising an AC generator connected to an engine, a power conversion equipment with an electronic power rectifier and an electronic power inverter, and a battery for engine starting, wherein inverter operation of the electronic power rectifier is executed, using the battery as a power supply, when the engine is started, and an electric motor operation of the AC generator is performed, the cost for the electronic power rectifier is reduced by the rectifier comprising a half bridge circuit.

However, in a previous engine generator, a high voltage battery with a capacity of more than the output of the generator is required as described above in order to drive the generator as an engine starting electric motor. But the high-voltage battery is expensive. Moreover, the engine generator in which a generator output circuit and an electric motor starting circuit are separately provided has not met the demand for smaller size and reduction in the number of components.

Though the number of components can be reduced in the previous engine generator, in which the generator output circuit is also used as the electric motor starting circuit as proposed in the above-described publication, there has been a problem that separate switching of wiring connection for operation as an electric motor (when an engine is started) and as a generator is required to make the configuration and the control complex, because a part of an inverter for obtaining AC output, or a reactor on its output side is used as a converter for step up of voltage.

SUMMARY OF THE INVENTION

The object of the present invention is to solve the above problem, and to provide an engine generator, sufficiently meeting a demand for smaller size, reduction in the number of components, a simple configuration and easy control.

In order to accomplish the object, a first aspect of the present invention is an engine generator comprising a generator connected to an engine, a rectifier circuit which rectifies the output of the generator, and an inverter in which the output of the rectifier circuit is converted into AC power of a predetermined frequency for output, wherein the generator is a dual-purpose generator both for a generator function and for an electric motor function, a drive inverter circuit which drives the dual-purpose generator as an engine starting electric motor is provided, the rectifier circuit comprises rectifying elements which are provided in parallel with each switching element of the drive inverter circuit, a DC—DC converter, in which a low DC voltage on a primary side and a high DC voltage on a secondary side are set for the output-terminal side of the battery and the output side of the rectifier circuit, respectively, is provided between the output side of the rectifier circuit and the output terminal of a battery, and the dual-purpose generator is driven as an engine starting electric motor, using the battery as a power supply, when the engine is started.

A second aspect of the present invention is the engine generator, wherein a regulator which controls an input voltage to the inverter is provided on the output side of the rectifier circuit, and the secondary side of the DC—DC converter is connected between the rectifier circuit and the regulator.

A third aspect of the present invention is the engine generator, wherein the DC—DC converter is a two-way DC—DC converter.

A fourth aspect of the present invention is the engine generator, wherein the two-way DC—DC converter comprises: a terminal for a low-voltage side; a terminal for a high-voltage side; a transformer including a winding wire for the low-voltage side and a winding wire for the high-voltage side; a switching element for the low-voltage side inserted between the terminal for the low-voltage side and the winding wire for the low-voltage side; a switching element for the high-voltage side inserted between the terminal for the high-voltage side and the winding wire for the high-voltage side; a rectifying element for the low-voltage side connected in parallel with the switching element for the low-voltage side; a rectifying element for the high-voltage side connected in parallel with the switching element for the high-voltage side, and a control circuit which controls the switching element for the low-voltage side and the switching element for the high-voltage side.

According to a first aspect of the present invention, a simple circuit configuration and easy control is realized because the generator output circuit and the electric motor starting circuit are not required separately to be provided and separate switching of wiring connection for operation as an electric motor and as a generator is not required.

And, according to a second aspect of the present invention, it is possible not to apply a high voltage from a DC—DC converter to an inverter. Accordingly, since a high withstand voltage is not required, only a cheap inverter with a simple configuration is required.

Moreover, according to a third aspect of the present invention, a battery is able to be charged, or electric power can be derived from the battery according to the output voltage of a rectifier circuit at operation after an engine is started. Thereby, even when the output of a generator becomes insufficient due to a temporary increase in the load, it is possible to replenish the deficiency by the electric power from the battery.

In addition, according to a fourth aspect of the present invention, a simple configuration for the DC—DC converter can be realized.

DETAILED DESCRIPTION OF THE PREFERRED EMBODIMENTS

Figure 1:
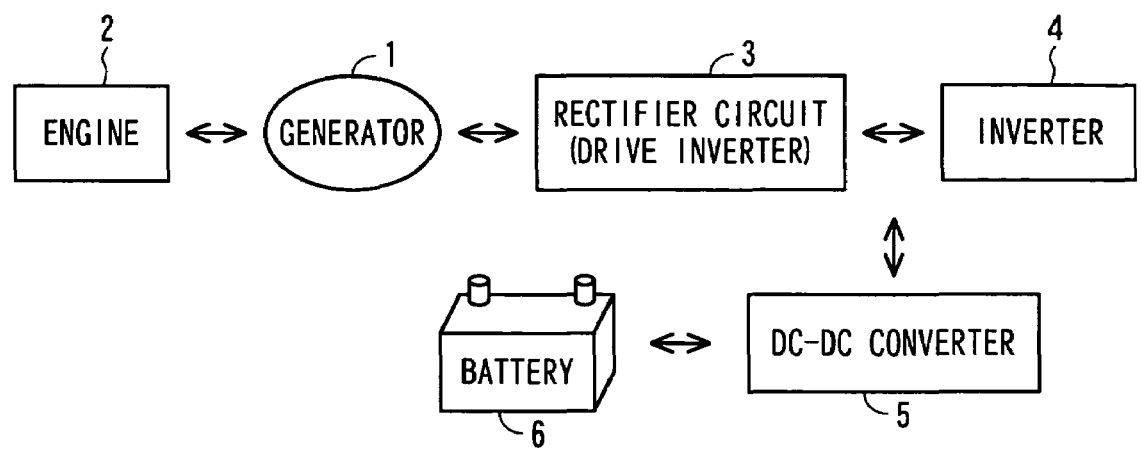
FIG. 1 is a block diagram showing a concept of an engine generator according to the present invention.

Hereinafter, the present invention will be explained in detail, referring to drawings. FIG. 1 is a block diagram showing a concept of an engine generator according to the present invention. In the drawing, a generator 1 is connected to an engine 2. The generator 1 comprises, for example, a three-phase multipolar magnet generator and is a dual-purpose generator both for a generator function and for an electric motor function, which can be also operated as an electric motor.

A rectifier circuit 3 comprising a bridged rectifying element rectifies the output of the generator 1. Moreover, switching elements such as field effect transistors (FETs) are connected in parallel with each rectifying element in the rectifier circuit 3. These switching elements form a drive inverter by which a DC voltage is converted into a three-phase AC voltage by ON-OFF control of the switching elements for application to the generator 1. Here, the rectifying elements forming the rectifier circuit 3 may be a parasitic diode of the switching elements such as FET, or a joint diode which is separately connected. An inverter 4 converts the output of the rectifier circuit 3 into AC power of a predetermined frequency for output.

In a DC—DC converter 5, the voltage of a battery 6 is step upped by driving a switching element for the battery side, and the step-upped voltage is applied to the output side of a rectifier circuit 3. Hereinafter, the side of the battery and that of a rectifier circuit 3 in the DC—DC converter 5 will be called as a primary side, and a secondary side, respectively. The battery 6 is, for example, a 12 V battery which has been generally used for a self starter.

Then, operations in FIG. 1 will be explained. In the first place, the DC—DC converter 5 is driven in such a way that power conversion is executed from the primary side to the secondary side when the engine 2 is started. This is achieved by driving a switching element on the primary side of the DC—DC converter 5 and by rectifying the output induced on the secondary side. The DC voltage of the battery 6, which has been step-upped by the above-described operation, is applied to the drive inverter (rectifier circuit) 3. The DC voltage is converted into a three-phase AC voltage by ON-OFF control of the switching element of the drive inverter 3 driven by a starting command of the engine 2 for application to the generator 1. Thereby, the generator 1 is started as an engine starting electric motor.

When the engine 2 is started, the generator 1 is driven by the engine 2 to stop the switching operation of the drive inverter 3. The output of the generator 1 is rectified through the rectifier circuit (not operated as an inverter) 3 and is converted into AC power of a predetermined frequency in an inverter 4 for output.

If the DC—DC converter 6 is a two-way DC—DC converter, the battery 6 can be charged by the output of the rectifier circuit 3 because the DC—DC converter 5 is connected to the output side of the rectifier circuit 3. That is, the DC—DC converter 6 is driven in such a way that power conversion is executed from the secondary side to the primary side when the output of the generator 1 is enough and the voltage of the battery 6 is reduced. Thereby, the battery 6 can be charged by the reduced voltage.

Moreover, if the DC—DC converter 6 is a two-way DC—DC converter and the primary side and the secondary side are driven in full synchronization with each other, that is, by the same drive signal, automatic power exchange can be executed by relative difference in the voltage between the primary side and the secondary side caused by the turns ratio of a transformer.

Figure 2:
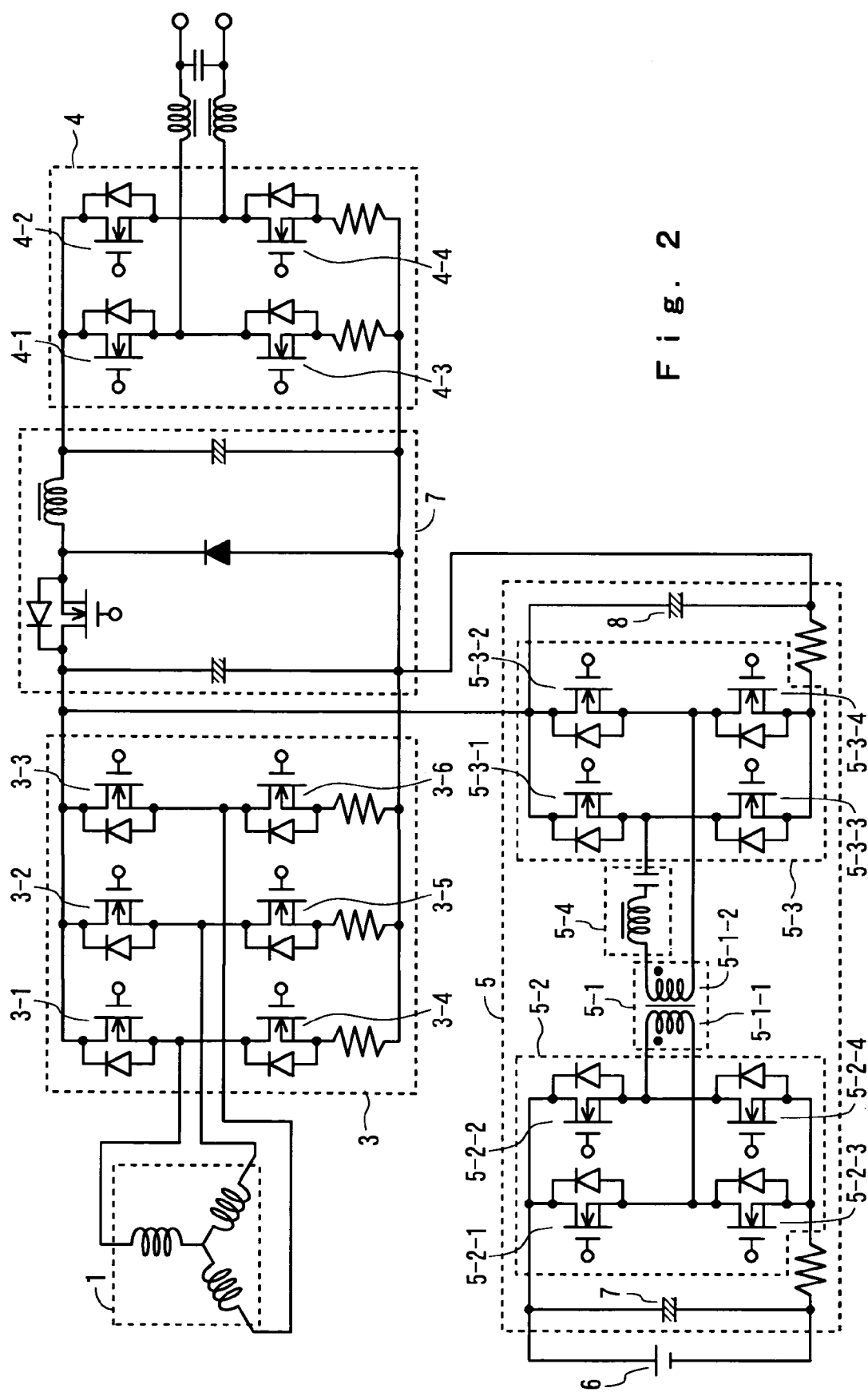
FIG. 2 is a circuit diagram showing a circuit realizing one embodiment of the engine generator according to the present invention.

FIG. 2 is a circuit diagram showing a circuit realizing one embodiment of the engine generator according to the present invention, and the same parts as or parts similar to those previously described with reference to FIG. 1 are denoted by the same reference numbers as those in FIG. 1. The three-phase generator 1 is connected to an engine (not shown). The output side of the generator 1 is connected to the drive inverter. The drive inverter has a configuration in which, for example, six switching elements (hereinafter, called as FETs), such as FETs, 3-1 through 3-6 are bridged.

Rectifying elements such as a diode are connected in parallel with each FET 3-1 through 3-6. The rectifying elements may be a parasitic diode of FETs, or a joint diode which is separately connected, and the rectifier circuit 3 comprises the rectifying elements.

The output side of the rectifier circuit 3 is connected to the inverter 4 through a smoothing and regulating circuit 7 which can comprise a regulator. The inverter 4 has a configuration in which, for example, four FETs 4-1 through 4—4 are bridged.

A node between the rectifier circuit 3 and the smoothing and regulating circuit 7 is connected to the secondary side of the DC—DC converter 5 and the primary side of the DC—DC converter 5 is connected to, for example, the battery 6 of 12 V.

In this embodiment, the DC—DC converter 5 is a two-way DC—DC converter and is provided for two-way exchange of electric power between the output of the battery 6 and that of the rectifier circuit 3, and the DC—DC converter 5 comprises a transformer 5-1 provided with a winding wire 5-1-1 for the low-voltage side as the primary side and a winding wire 5-1-2 for the high-voltage side as the secondary side. The step-up voltage ratio of the two-way DC—DC converter 5 is defined by the turns ratio between the winding wire 5-1-1 for the low-voltage side and the winding wire 5-1-2 for the high-voltage side.

A switching section 5-2 for the lower voltage side and a switching section 5-3 for the higher voltage side are provided on the side of the winding wire 5-1-1 for the low-voltage side and the side of the winding wire 5-1-2 for the high-voltage side, respectively. The switching section 5-2 for the lower voltage side has a configuration in which, for example, four FETs 5-2-1 through 5-2-4 are bridged, and, similarly, the switching section 5-3 for the higher voltage side comprises four FETs 5-3-1 through 5-3-4.

Rectifying elements such as a diode are connected in parallel with each FET 5-2-1 through 5-2-4, and 5-3-1 through 5-3-4 in the switching section 5-2 for the lower voltage side and the switching section 5-3 for the higher voltage side, respectively. The rectifying elements may be a parasitic diode of FETs, or a joint diode which is separately connected. Assuming that the rectifying elements which have been connected in parallel could be treated as one unit, the switching section 5-2 for the lower voltage side and the switching section 5-3 for the higher voltage side could be considered to be a switching and rectifying section, respectively.

An LC resonant circuit 5-4 is provided on the side of the winding wire 5-1-2 for the high-voltage side of the transformer 5-1. An LC resonant circuit 5-4 has a function by which a current which flows when at least one of the switching section 5-2 for the lower voltage side and the switching section 5-3 for the higher voltage side is driven is changed to a sinusoidal current, and switching losses are reduced, and destruction of FETs by a large current are prevented. The reason is that ON-OFF control of FETs can be executed approximately at a point crossing the zero level of the sinusoidal current.

Switching control of FETs 5-2-1 through 5-2-4 in the switching section 5-2 for the lower voltage side and FETs 5-3-1 through 5-3-4 in the switching section 5-3 for the higher voltage side is executed by a control circuit (not shown) comprising a CPU and the like. Here, capacitors 7, 8 connected to the primary side and the secondary side, respectively, are a capacitor for output smoothing.

Subsequently, operations in FIG. 2 will be explained. In the first place, a switching section 5-2 for the lower voltage side in the DC—DC converter 5 is driven when the engine is started. The DC voltage of the battery 6, which has been step-upped by the above-described operation, is applied to the drive inverter (rectifier circuit) 3. Since the drive mode of the switching section 5-2 for the lower voltage side is similar to that of a common DC—DC converter, the explanation will be eliminated. The applied DC voltage is converted into a three-phase AC voltage by the drive inverter 3 for application to the generator 1. Thereby, the generator 1 is started as an engine starting electric motor.

When the engine is started, the generator 1 is driven by the engine to generate the output, and to stop the switching operation of the drive inverter 3. The output of the generator 1 is rectified in the rectifier circuit (the drive inverter) 3, and smoothed and regulated in the smoothing and regulating circuit 7. Furthermore, the output is converted into AC power of a predetermined frequency in the inverter 4 for output.

If a switching section 5-3 for the higher voltage side in the DC—DC converter 5 is driven when the voltage of the battery 6 is reduced, the output voltage of the rectifier circuit 3 is reduced in the DC—DC converter 5. Thereby, the battery 6 can be charged by the reduced voltage.

Moreover, the switching section 5-2 for the lower voltage side and the switching section 5-3 for the higher voltage side of the DC—DC converter 5 can be driven in full synchronization with each other, that is, by the same drive signal, when the generator 1 is driven by the engine. Thus, automatic power exchange between the side of the rectifier circuit (the drive inverter) 3 and that of the battery 6 can be executed according to relative difference in the voltage between the primary side and the secondary side caused by the turns ratio of the transformer.

Though the embodiments have been explained as described above, various kinds of changes and modifications could be made. For example, in order to drive the generator 1 as an engine starting electric motor, using the battery 6 as a power supply when the engine is started, the DC—DC converter 5 is required only to have a configuration in which power conversion is executed from the primary side to the secondary side. Moreover, though the regulator in the smoothing and regulating circuit 7 is not necessarily required, it is possible not to apply a high voltage from the DC—DC converter 5 to the inverter 4, and a high withstand voltage is not required when the regulator is provided. Furthermore, an LC resonant circuit 5-4 in the DC—DC converter 5 can be provided not in the secondary side, but in the primary side.

According to the present invention, a simple circuit configuration and easy control is realized because the generator output circuit and the electric motor starting circuit are not required separately to be provided and separate switching of wiring connection for operation as an electric motor and as a generator is not required, as explained above in detail.

And, by the configuration in which the DC—DC converter is a two-way DC—DC converter, the battery is able to be charged, or electric power can be derived from the battery according to the output voltage of the rectifier circuit when an operation is started after the engine is started. Thereby, even when the output of the generator becomes insufficient due to a temporary increase in the load, it is possible to replenish the deficiency by the electric power from the battery.

In addition, there can be provided the engine generator in which, while using a battery (12 V) which has been widely used, for example, for general vehicle use as a power supply without using an expensive high voltage battery, the generator output circuit and the electric motor starting circuit are not required separately to be provided, and, also, the generator and the engine starting electric motor are not required separately to be provided.

What is claimed is:

1. An engine generator comprising a generator connected to an engine, a rectifier circuit which rectifies the output of the generator, and an inverter in which the output of the rectifier circuit is converted into AC power of a predetermined frequency for output, wherein
    the generator is a dual-purpose generator both for a generator function and for an electric motor function,
    a drive inverter circuit which drives the dual-purpose generator as an engine starting electric motor is provided,
    the rectifier circuit comprises rectifying elements which are provided in parallel with each switching element of the drive inverter circuit,
    a DC—DC converter, in which a low DC voltage on a primary side and a high DC voltage on a secondary side are set for the output-terminal side of a battery and the output side of the rectifier circuit, respectively, is provided between the output side of the rectifier circuit and the output terminal of the battery, and
    the dual-purpose generator is driven as an engine starting electric motor, using the battery as a power supply, when the engine is started.

2. The engine generator according to claim 1, wherein
    a regulator which controls an input voltage to the inverter is provided on the output side of the rectifier circuit, and
    the secondary side of the DC—DC converter is connected between the rectifier circuit and the regulator.

3. The engine generator according to claim 1, wherein the DC—DC converter is a two-way DC—DC converter.

4. The engine generator according to claim 3, wherein the two-way DC—DC converter comprises: a terminal for a low-voltage side; a terminal for a high-voltage side; a transformer including a winding wire for the low-voltage side and a winding wire for the high-voltage side; a switching element for the low-voltage side inserted between the terminal for the low-voltage side and the winding wire for the low-voltage side; a switching element for the high-voltage side inserted between the terminal for the high-voltage side and the winding wire for the high-voltage side; a rectifying element for the low-voltage side connected in parallel with the switching element for the low-voltage side; a rectifying element for the high-voltage side connected in parallel with the switching element for the high-voltage side, and a control circuit which controls the switching element for the low-voltage side and the switching element for the high-voltage side.

* * * * *